United States Patent Office 3,557,135
Patented Jan. 19, 1971

3,557,135
2-β-HYDROXY ETHYLAMINO-4-5-DIPHENYL-OXAZOLE
Enzo Marchetti, Rome, Italy, assignor to Istituto Farmacologico Serono S.p.A., Rome, Italy, a corporation of Italy
No Drawing. Filed Aug. 8, 1967, Ser. No. 659,574
Claims priority, application Italy, Aug. 10, 1966, 18,390/66
Int. Cl. C07d 85/44
U.S. Cl. 260—307                        1 Claim

ABSTRACT OF THE DISCLOSURE

A series of 2-amino-substituted 4,5-diphenyl-oxazoles having anti-inflammatory properties.

---

The objects of the present invention are a series of 2-amino-substituted 4,5-diphenyl-oxazoles having anti-inflammatory properties, the process for preparing these compounds, the pharmacological properties thereof, and their employment in therapeutics.

These new derivatives can be represented by the following general Formula I:

$$\begin{array}{c} C_6H_5-C\!=\!\!=\!\!N \\ \phantom{C_6H_5-}\|\phantom{xx}\| \\ C_6H_5-C\phantom{xx}C-R \\ \phantom{xxxxx}\diagdown\!O\!\diagup \end{array} \qquad (I)$$

wherein R can be:

(a) a monoalkyl-substituted amine group (for example R=NHCH$_3$);
(b) a dialkyl-substituted amine group (for example R=N(CH$_3$)$_2$);
(c) a hydroxyalkyl-substituted amine group (for example R=NHCH$_2$CH$_2$OH);
(d) an alkyl and hydroxyalkyl-substituted amine group (for example, $$R\!=\!N\!\diagup^{CH_3}_{\diagdown CH_2CH_2OH}$$

(e) a bis(hydroxyalkyl)-substituted amine group for example, R=N(CH$_2$CH$_2$OH)$_2$;
(f) an N,N-dialkyl-aminoalkyl-substituted amine group (for example, $$R\!=\!NHCH_2CH_2N\!\diagup^{C_2H_5}_{\diagdown C_2H_5}$$

(g) an amine group belonging to a heterocyclic structure with five or six atoms, incorporating a heteroatom or not (for example:

$$R\!=\!N\!\!<\!\!\square\;\;,\;R\!=\!N\!\!<\!\!\bigcirc\;\;,N,R\!=\!N\!\!<\!\!\bigcirc\!\!O).$$

Particularly, this invention relates to the following products having the Formula I, wherein R is:

(1) R=NHCH$_3$
(2) R=NHC$_2$H$_5$
(3) R=NHCH(CH$_3$)$_2$
(4) R=NH(CH$_2$)$_3$CH$_3$
(5) R=N(CH$_3$)$_2$
(6) R=N(C$_2$H$_5$)$_2$
(7) R=NHCH$_2$CH$_2$OH (8) R=N—CH$_2$CH$_2$OH
       |
       CH$_3$ (9) R=N—CH$_2$CH$_2$OH
       |
       C$_2$H$_5$

(10) R=N(CH$_2$CH$_2$OH)$_2$
(11) R=NHCH$_2$CH$_2$N(CH$_3$)$_2$
(12) R=NHCH$_2$CH$_2$N(C$_2$H$_5$)$_2$
(13) R=NHCH$_2$CH$_2$CH$_2$N(CH$_3$)$_2$
(14) R=NHCH$_2$CH$_2$CH$_2$N(C$_2$H$_5$)$_2$

(15) R=N⟨□⟩

(16) R=N⟨◯⟩

(17) R=N⟨◯⟩O

(18) R=N⟨◯⟩NH

(19) R=N⟨◯⟩N—COOC$_2$H$_5$

(20) R=N⟨◯⟩N—CH$_3$

The only member of this series which has been previously described in literature, is N-dimethylamino-4,5-diphenyl-oxazole (the 5th product), but, on the other hand, its anti-inflammatory activity has never been described before, and was discovered by me.

An object of the present invention is represented by the above mentioned substances, as new products, never before obtained synthetically, nor described in literature, except N-dimethyl-amino-4,5-diphenyl-oxazole.

A further object of the present invention is represented by the processes of synthesis, as hereinafter specified, which lead to the compounds represented generally by Formula I.

A third feature relates to the pharmacological activity and the consequent application in therapeutics of the derivatives which are the object of the present invention; and this applies also to N-dimethylamino-4,5-diphenyl-oxazole.

As a matter of fact, these compounds have shown, in experimental animals (mice, rate, guinea pigs, rabbits), beyond a low toxicity, also an anti-inflammatory and anti-phlogistic action like that of phenylbutazone, without causing however the well-known toxic effects of the latter substance.

By way of example, here is a summary of some of the pharmacological properties of the products which are the object of the present invention.

The average lethal dose for mice (LD$_{50}$) by mouth is between 400 and 5000 mg./kg., and particaularly for the products of greater interest, is 10 to 16 times lower than that of phenylbutazone, as is shown by the following exemplary data:

Phenylbutazone: LD$_{50}$=290 mg./kg. by mouth in mice
2-methylamino-4,5-diphenyl-oxazole: LD$_{50}$=3100 mg./kg. by mouth in mice
2-diethylamino-4,5-diphenyl-oxazole: LD$_{50}$=5200 mg./kg by mouth in mice
2-bis(β-hydroxyethyl)amino-4,5-diphenyl-oxazole: LD$_{50}$=320 mg./kg. by mouth in mice
2-pyrrolidino-4,5-diphenyl-oxazole: LD$_{50}$=4700 mg./kg. by mouth in mice The anti-inflammatory properties of the product which are the object of the present invention have been evidenced in laboratory animals as follows:

Groups of rats of the same breeding and same weight were anesthetized with ether, and two previously sterilized small bundles of cotton fibers weighing 30±1 mg. on the average, were introduced into two subcutaneous pockets of every rat, in a latero-abdominal position. In order to avoid possible infection processes due to the operation, 0.2 ml. of a 0.15% antibiotic solution were added to every subcutaneous pocket containing the cotton.

The test products, suspended in 5% gum arabic solution, were administered daily through gastric passage proper doses to various rat groups, while a group of animals of equal number was held as a control and treated daily by mouth with an equal volume of 5% gum arabic solution.

The treatment lasted four days; at the 5th day the animals were killed and the bundle of cotton fibres with the granulation tissue which was formed, was isolated, dried at 60° for 24 hours and then weighed. The less the weight of granulation tissue formed, the greater the anti-inflammatory efficiency of the test substances.

By way of example, here are the data obtained in one experiment.

| Number of rats | Compound | Daily dose, mg./kg., by mouth | Granulation tissue, dry wt. | Inhibition, percent |
|---|---|---|---|---|
| 40 | Controls | | 69 | |
| 20 | Phenylbutazone | 10 | 61 | 11.6 |
| 20 | do | 30 | 57 | 17.4 |
| 20 | do | 90 | 53 | 23.2 |
| 20 | 2-bis(β-hydroxyethyl)amino-4,5-diphenyl-oxazole | 10 | 58 | 15.9 |
| 20 | do | 30 | 56 | 18.9 |
| 20 | do | 90 | 52 | 24.6 |
| 20 | 2-pyrrolidino-4,5-diphenyloxazole | 10 | 61 | 11.6 |
| 20 | do | 30 | 58 | 15.9 |
| 20 | do | 90 | 54 | 20.7 |

Another method for evaluating the anti-inflammatory activity was that of measuring the inhibition of the oedema acutely produced by the injection of an irritant substance (phlogistic agent) in the plantar area of a posterior limb of a rat.

For carrying out this test, various groups of rats of same weight and breeding were administered through gastric passage with the various compounds to be tested suspended in 5% gum arabic solution. After one hour, 0.1 ml. of a 1% carrageen solution was injected subcutaneously into the plantar area of the left posterior limb of each animal. The limb volume was measured with a suitable apparatus, immediately and after 3 hours. The substances having an anti-inflammatory activity should inhibit the formation of the oedema caused by the phlogistic agent, that is, the average of the volumes of the limbs of the rats subjected to the treatment with active products should be less than that of the control animals.

The following table illustrates the above stated:

during a long period of time, has not permitted the observation of any variation of the body growth curve, of the reactivity, of appetite, of the excretion and nature of feces and urine. Neither were changes observed in the amount and morphological characters of red cells, of leukocytes, of the blood clotting time and of hematocrit.

For their low toxicity and their particular anti-inflammatory activity, the compounds of this invention find a useful application in therapeutics as drugs, particularly as anti-inflammatory agents, either alone or conveniently associated with other drugs. When admixed with suitable excipients, as starch, talc, lactose, magnesium stearate, gelatin, gums, and so on, they can be administered to humans by mouth under the form of tablets, sugar-coated pills and the like in rheumatoid arthritis, in inflammatory chronical arthropathies, in acute muscle-skeleton diseases, and so on.

For the preparation of a drug containing one of the claimed compounds and which can be administered by mouth under the form of a tablet, the following example is presented:

| | Mg. |
|---|---|
| 2-pyrrolidino-4,5-diphenyl-oxazole | 250 |
| Lactose | 38 |
| Starch | 22 |
| Gelatin | 6 |
| Magnesium stearate | 4 |
| Talc | 30 |
| | 350 |

With the powder mixture, suitably granulated in the usual manner, tablets weighing 350 mg. and having a diameter of 11 mm. are prepared.

The tablets may have the nature of sugar-coated pills by coating them with sugar by the conventional operations of confectionary.

A process of synthesis of the compounds represented

| Number of rats | Compound | Dose, mg./kg., by mouth | Oedema, in cc. | Inhibition, percent in comparison with controls |
|---|---|---|---|---|
| 45 | Controls | | 0.78 | |
| 15 | Phenylbutazone | 10 | 0.56 | 28 |
| 15 | do | 30 | 0.36 | 54 |
| 15 | do | 90 | 0.23 | 71 |
| 20 | 2-bis(β-hydroxyethyl)amino-4,5-diphenyl-oxazole | 10 | 0.50 | 36 |
| 20 | do | 30 | 0.34 | 56 |
| 20 | do | 90 | 0.21 | 73 |
| 20 | 2-pyrrolidino-4,5-diphenyl-oxazole | 10 | 0.67 | 20 |
| 20 | do | 30 | 0.41 | 48 |
| 20 | do | 90 | 0.15 | 81 |

The compounds which are the object of the present invention, when subjected to the two above tests, showed an activity equal to or higher than that of phenylbutazone.

The administration by mouth to rats of the compounds of this invention at doses of 400 to 800 mg./kg. daily, by Formula I comprises reacting in the dry state or in a suitable organic solvent (benzene, toluene, xylene, pyridine, and so on), under warm conditions and atmospheric pressure, or under pressure in a sealed tube, 2-chloro-4,5-diphenyl-oxazole with the various amines, alkanolamines, dialkylaminoalkylamines, in an excess amount or in molar ratios, in the presence of a base (for example, a tertiary amine) as an accepter of the hydrochloric acid developed during the reaction.

Another process of synthesis consists schematically of the reaction between desyl chloride or bromide with a suitably N,N-disubstituted urea compound (for example, N,N-diethylurea), by operating under warm conditions and in a suitable solvent.

A particular method of synthesis has been employed for the preparation of 2-piperazino-4,5-diphenyl-oxazole, which is obtained by saponifying 2-($N_1$-carbethoxy, $N_2$-piperazinyl)-4,5-diphenyl-oxazole with sodium hydroxide in hydro-alcoholic solution, in suitable conditions.

The following examples, which are given just as an explanation and not as a limitation, serve to illustrate with more details the new compounds, as obtained according to this invention, and their methods of preparation.

EXAMPLE 1

A solution of 12.75 g. 2-chloro-4,5-diphenyl-oxazole and 9.3 g. methylamine in 100 ml. dry benzene was warmed at 120° C. for 6 hours in a sealed tube. The reaction mixture was washed with water and the separated benzene phase was stripped at the pressure of 1 mm. The oily residue was dissolved at 60° in 50 ml. 95% ethanol and the obtained solution, cooled to 0°, allowed the separation of 9 g. of 2-methylamino-4,5-diphenyl-oxazole crystals, M.P. 167–168° (yield, 72%).

EXAMPLE 2

By the same method as described in Example 1, but by reacting 12.75 g. 2-chloro-4,5-diphenyl-oxazole and 9 g. dimethylamine in 100 ml. dry benzene, there was obtained 8.7 g. 2-dimethylamino-4,5-diphenyl-oxazole (yield, 70%), which was purified by dissolution in ethyl ether+petroleum ether: M.P., 77–79° C.

EXAMPLE 3

A solution of 12.75 g. 2-chloro-4,5-diphenyl-oxazole and 13.5 g. ethylamine in 100 ml. dry benzene was reacted in the conditions described in Example 1 to obtain 9.3 g. 2-ethylamino-4,5-diphenyl-oxazole (yield 70.5%); M.P. 144–146° C.

EXAMPLE 4

By reacting, in the conditions described in Example 1, 12.75 g. 2-chloro-4,5-diphenyl-oxazole and 17.7 g. isopropylamine in 100 ml. dry benzene there was obtained 11 g. 2-isopropylamino-4,5-diphenyl-oxazole (yield, 81.5). The product crystallized from n-hexane: M.P. 135–137° C.

EXAMPLE 5

A solution of 5.1 g. 2-chloro-4,5-diphenyl-oxazole and 4.4 g. n-butylamine in 50 ml. dry benzene was refluxed for 4 hours. The reaction mixture was cooled, washed with water and the benzene phase was evaporated to dryness at 1 mm. The solid residue was dissolved at 60° in 40 ml. 95% ethanol; by cooling to 0° the obtained clear solution, 4.7 g. 2-n-butylamino-4,5-diphenyl-oxazole crystallized (yield: 81%); M.P. 91–93°.

EXAMPLE 6

By following the same method as described in Example 5, from 5.1 g. 2-chloro-4,5-diphenyl-oxazole, 4.4 g. diethylamine and 50 ml. dry benzene there was obtained 3.2 g. crystals of 2-diethylamino-4,5-diphenyl-oxazole (yield, 55%), which was purified by recrystallization from 60% ethanol; M.P. 74–75°.

EXAMPLE 7

A solution of 5.1 g. 2-chloro-4,5-diphenyl-oxazole and 3.6 g. 2-aminoethanol in 50 ml. absolute ethanol was refluxed for 4 hours. The solvent was stripped at 1 mm. and the oily residue was added at 60° with 100 ml. 50% ethanol; by cooling the hydro-alcoholic solution, 3.6 g. 2(β-hydroxyethyl)amino-4,5 - diphenyl-oxazole crystallized (yield, 64.3%). This was purified by dissolving in ethyl ether+petroleum ether; M.P. 106–108°.

EXAMPLE 8

By the same method as described in Example 7, from 5.1 g. 2-chloro-4,5-diphenyl-oxazole, 6.3. g. diethanolamine and 50 ml. absolute ethanol, 4.5 g. 2-bis(β-hydroxyethyl) amino-4,5-diphenyl-oxazole was obtained (yield, 69.5%). The product crystallized from ethyl ether+petroleum ether, with a M.P. of 96–98°.

EXAMPLE 9

5.1 g. 2-chloro-4,5-diphenyl-oxazole and 4.5 g. 2-N-methylamino-ethanol were dissolved in 50 ml. absolute ethanol and reacted in the conditions described in Example 7: there was formed 4.5 g. 2-(N-methyl-N-β-hydroxyethyl)-amino-4,5-diphenyl-oxazole (yield, 76.5%). M.P., 99–100° (from 60% ethanol).

EXAMPLE 10

Following the reaction conditions as described in Example 7, from 5.1 g. 2-chloro-4,5-diphenyl-oxazole and 5.34 g. 2-N-ethylamino-ethanol dissolved in 50 ml. absolute ethanal there was obtained 3.2 g. 2-(N-ethyl-N-β-hydroxyethyl)amino-4,5-diphenyl - oxazole (yield 52%), M.P. 55–57° (from 60% ethanol).

EXAMPLE 11

A solution of 5.1 g. 2-chloro-4,5-diphenyl-oxazole and 7 g. β-diethylaminoethylamine in 50 ml. dry xylene was refluxed for 6 hours. The reaction mixture was cooled and washed with water; xylene was stripped at 0.1 mm. and the oily residue was dissolved at the boiling point in 40 ml. n-hexane; by cooling to 0° the obtained solution 4.6 g. 2-(β-diethylaminoethyl)amino-4,5-diphenyl-oxazole crystallized (yield, 68.7%); M.P. 83–84°.

EXAMPLE 12

By the same method as described in Example 11, from 5.1 g. 2-chloro-4,5-diphenyl-oxazole and 5.3 g. (β-dimethylamino-ethylamine in 50 ml. dry xylene there was obtained 3.8 g. 2-(β-dimethylamino-ethyl)amino-4,5-diphenyl-oxazole (yield, 62%); M.P. 84–85° (n-hexane).

EXAMPLE 13

By reacting in the same conditions described in Example 11, 5.1 g. 2-chloro-4,5-diphenyl-oxazole, 7.8 g. γ-diethylaminopropyl-amine in 50 ml. dry xylene there was obtained 4.9 g. 2-(γ-diethyl-aminopropyl)-amine-4,5-diphenyl-oxazole (yield, 70.2%); M.P. 100–101° (n-hexane).

EXAMPLE 14

By the same method described in Example 11, from 5.1 g. 2-chloro-4,5-diphenyl-oxazole and 6.12 g. γ-dimethylaminopropylamine in 50 ml. dry xylene there was obtained 5.2 g. 2-(γ-dimethylaminopropyl)-amino - 4,5-diphenyl-oxazole (yield, 81%); M.P. 92–93° (n-hexane).

EXAMPLE 15

A solution of 5.1 g. 2-chloro-4,5-diphenyl-oxazole, 4.26 g. pyrrolidine in 50 ml. dry xylene was refluxed for 4 hours. The reaction mixture was cooled and washed with water, and the xylene phase was evaporated to dryness at 0.1 mm. The solid residue obtained was dissolved in 40 ml. 95% ethanol at the boiling point; on cooling the alcoholic solution 4.4 g. 2-pyrrolidino-4,5-diphenyl-oxazole crystallized (yield, 75.8); M.P. 121–122°.

EXAMPLE 16

By the same method described in Example 15, from 5.1 g. 2-chloro-4,5-diphenyl-oxazole and 5.1 g. piperidine in 50 ml. dry xylene there was obtained 5.2 g. 2-piperidino-4,5-diphenyl-oxazole (yield, 85.5%); M.P. 140–141° (95% ethanol).

EXAMPLE 17

5.1 g. 2-chloro-4,5-diphenyl-oxazole and 5.22 g. morpholine, dissolved in 50 ml. dry xylene, were reacted in the conditions described in Example 15: there was obtained 4.6 g. 2-morpholino-4,5-diphenyl-oxazole (yield, 75%); M.P. 122–124° (95% ethanol).

EXAMPLE 18

By the same method described in Example 15, from 5.1 g. 2-chloro-4,5-diphenyl-oxazole and 6.32 g. N-carbethoxy-piperazine in 50 ml. dry xylene there was obtained 6 g. 2-($N_1$-carbethoxy-$N_2$-piperazinyl) - 4,5 - diphenyl-oxazole (yield, 79.5%); M.P. 97–98° (95% ethanol).

EXAMPLE 19

By reacting, in the same conditions as described in Example 15, 5.1 g. 2-chloro-4,5-diphenyl-oxazole and 6 g. N-methylpiperazine in 50 ml. dry xylene there was obtained 4.3 g. 2-($N_1$-methyl-$N_2$-piperazinyl)-4,5-diphenyloxazole (yield, 67.4%); M.P. 55–58° (80% ethanol).

EXAMPLE 20

A suspension of 3 g. (2-N-carbethoxy)-piperazino-4,5-diphenyloxazole in 40 ml. of 10% NaOH and 40 ml. 95% ethanol was refluxed for 6 hours. Ethanol was stripped at 1 mm., the suspension diluted with 30 ml. water and acidified with HCl 10% solution. Then it was filtered, and on alkalizing the filtrate with 10% NaOH, 2-piperazino-4,5-diphenyloxazole precipitated, which was purified by crystallization from ethyl ether+petroleum ether, 1.8 g. (yield, 74.2%); M.P. 115–116°.

EXAMPLE 21

A mixture of 41.3 desyl bromide and 70 g. N',N'-diethylurea in 100 ml. N,N-dimethylformamide, was heated at 105°, under strong stirring, for 50 hours. The reaction mixture was cooled, distilled at 0.1 mm. to strip N,N-dimethylformamide, and the residue was treated with 150 ml. 10% NaOH in water, and extracted with ethyl ether. The ethereal extracts, washed with water and then decolorized with charcoal, after having been dried over anhydrous sodium sulfate, were separated from solvent at 20 mm.

The oily residue was dissolved at 60° in 100 ml. 70% ethanol, and the solution, cooled to 0°, allowed the separated of 23 g. crystals of 2-diethylamino-4,5-diphenyl-oxazole (yield, 53.5%); M.P. 74–75°.

I claim:
1. 2-β-hydroxyethylamino-4,5-diphenyl-oxazole.

No references cited.

ALEX MAZEL, Primary Examiner

J. TOVAR, Assistant Examiner

U.S. Cl. X.R.

260—247.5, 268; 424—248, 250